(12) United States Patent
Arunmozhi et al.

(10) Patent No.: US 11,654,866 B2
(45) Date of Patent: May 23, 2023

(54) FLUID SYSTEM FOR VEHICLE SENSOR

(71) Applicant: Ford Global Technologies, LLC, Dearborn, MI (US)

(72) Inventors: Ashwin Arunmozhi, Canton, MI (US); Michael Robertson, Jr., Garden City, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 380 days.

(21) Appl. No.: 16/986,491

(22) Filed: Aug. 6, 2020

(65) Prior Publication Data

US 2022/0041137 A1    Feb. 10, 2022

(51) Int. Cl.
| | |
|---|---|
| *B60S 1/48* | (2006.01) |
| *F16L 41/02* | (2006.01) |
| *G01L 19/00* | (2006.01) |
| *B05B 9/03* | (2006.01) |
| *B60S 1/56* | (2006.01) |
| *B60S 1/52* | (2006.01) |
| *B60S 1/66* | (2006.01) |
| *G01S 7/497* | (2006.01) |

(52) U.S. Cl.
CPC ............. *B60S 1/481* (2013.01); *B05B 9/035* (2013.01); *B60S 1/52* (2013.01); *B60S 1/56* (2013.01); *B60S 1/66* (2013.01); *F16L 41/023* (2013.01); *G01L 19/0007* (2013.01); *G01S 7/497* (2013.01); *G01S 2007/4977* (2013.01)

(58) Field of Classification Search
CPC ............................ F16L 41/023; F16L 41/008
See application file for complete search history.

(56) References Cited

U.S. PATENT DOCUMENTS

| | | | | |
|---|---|---|---|---|
| 3,996,765 | A | * | 12/1976 | Mullins .................. F25B 45/00 |
| 7,373,825 | B2 | * | 5/2008 | Fennington, Jr. ..... F16L 41/008 |
| 10,302,521 | B2 | * | 5/2019 | Hoffman ................ F25B 45/00 |
| 2008/0127742 | A1 | * | 6/2008 | Mueller ............. G01L 19/0015 |
| 2016/0195208 | A1 | * | 7/2016 | Cassiday ............... F16L 41/023 |

* cited by examiner

*Primary Examiner* — Zachary T Dragicevich
(74) *Attorney, Agent, or Firm* — Frank A. MacKenzie; Bejin Bieneman PLC

(57) ABSTRACT

A fluid system includes a one-way check valve including a check-valve inlet and a check-valve outlet; a Y-connector including a Y-connector inlet, a first Y-connector outlet, a second Y-connector outlet, and a pressure-sensor connector; an inlet hose fluidly connecting the check-valve outlet and the Y-connector inlet; and a pressure sensor fluidly connected to the Y-connector via the pressure-sensor connector. The Y-connector inlet, Y-connector outlets, and pressure-sensor connector are fluidly connected to each other inside the Y-connector.

20 Claims, 4 Drawing Sheets

FLUID SYSTEM FOR VEHICLE SENSOR

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Sensor operation can be affected by obstructions, e.g., dust, snow, insects, etc.

DETAILED DESCRIPTION

Figure 1:
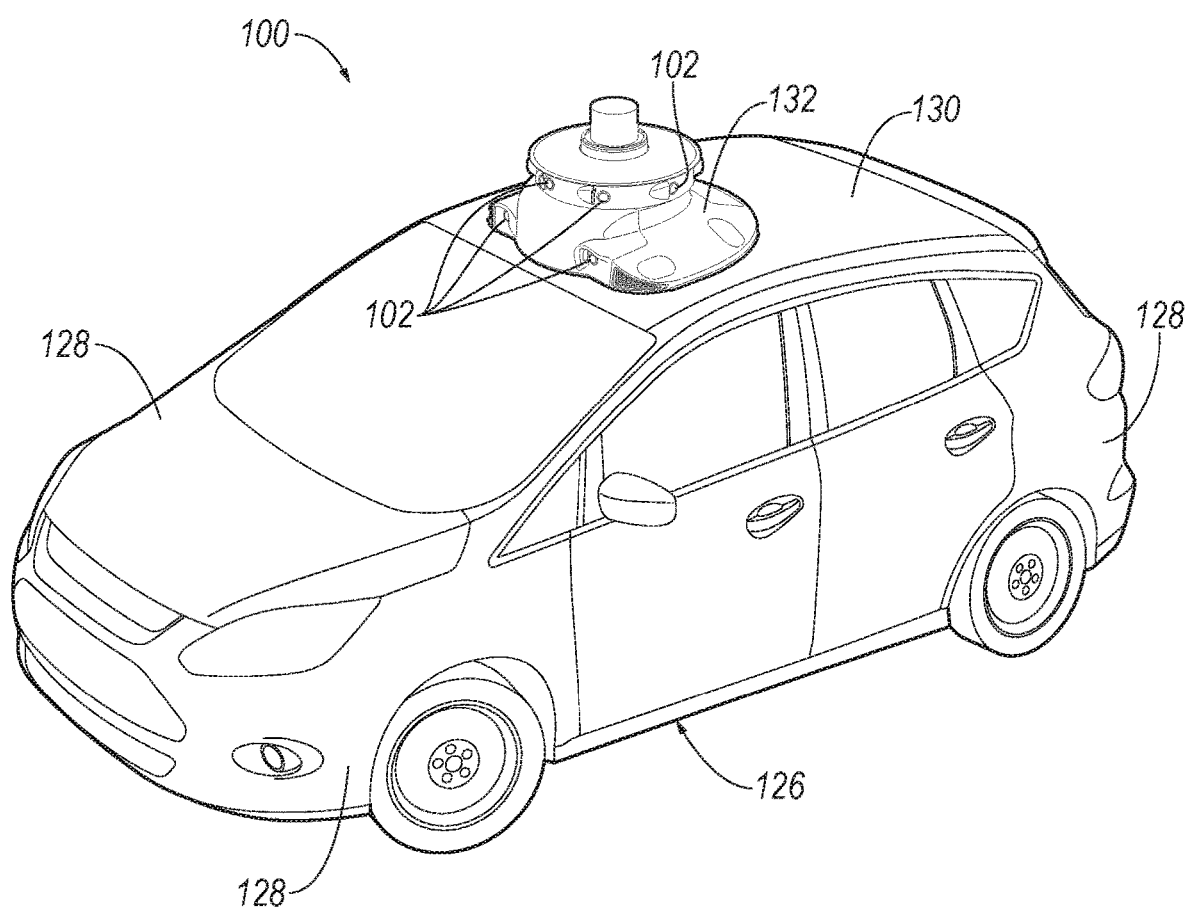
FIG. 1 is a perspective view of an example vehicle with a fluid system for cleaning sensors.

A fluid system includes a one-way check valve including a check-valve inlet and a check-valve outlet; a Y-connector including a Y-connector inlet, a first Y-connector outlet, a second Y-connector outlet, and a pressure-sensor connector; an inlet hose fluidly connecting the check-valve outlet and the Y-connector inlet; and a pressure sensor fluidly connected to the Y-connector via the pressure-sensor connector. The Y-connector inlet, Y-connector outlets, and pressure-sensor connector are fluidly connected to each other inside the Y-connector.

Flow directions defined by the Y-connector inlet and Y-connector outlets may be in a plane, and the flow direction of each Y-connector outlet may be at least 90° from the flow direction of the Y-connector inlet in the plane. The flow direction of each Y-connector outlet may be more than 90° from the flow direction of the Y-connector inlet in the plane.

A flow direction of the pressure-sensor connector may be in the plane. The flow direction of each Y-connector outlet may be less than 90° from the flow direction of the pressure-sensor connector in the plane.

The pressure sensor may be directly mounted to the pressure-sensor connector. The pressure sensor may include a male thread, and the pressure-sensor connector may include a female thread corresponding to the male thread. An internal diameter of the female thread may be greater than each internal diameter of the Y-connector outlets.

The Y-connector may include an inlet tunnel extending through the Y-connector inlet, a first outlet tunnel extending through the first Y-connector outlet, a second outlet tunnel extending through the second Y-connector outlet, a pressure-sensor tunnel extending from the pressure-sensor connector, and a junction at which the inlet tunnel, the outlet tunnels, and the pressure-sensor tunnel all meet.

An internal diameter of the first Y-connector outlet may be equal to an internal diameter of the second Y-connector outlet.

The Y-connector may be a single piece.

The fluid system may further include a pump positioned to supply the check-valve inlet.

The Y-connector may include a Y-connector body, and the Y-connector inlet, Y-connector outlets, and pressure-sensor connector extend from the Y-connector body. The Y-connector may include a mounting plate extending from the Y-connector body. The fluid system may further include a housing to which the mounting plate is attached, a plurality of sensors fixed relative to the housing inside the housing, and a plurality of nozzles aimed at the sensors, and each nozzle may be fluidly connected to one of the first Y-connector outlet or the second Y-connector outlet.

The fluid system may further include a plurality of sensors and a plurality of nozzles aimed at the sensors, and each nozzle may be fluidly connected to one of the first Y-connector outlet or the second Y-connector outlet. The fluid system may further include two manifolds, one positioned to receive flow from the first Y-connector outlet and the other positioned to receive fluid flow from the second Y-connector outlet, and the nozzles may each be positioned to receive fluid flow from one of the two manifolds. The manifolds may each include a plurality of valves, and each valve may be positioned and operable to control fluid flow to one of the nozzles. The fluid system may further include a computer communicatively coupled to the pressure sensor and the valves, and the computer may be programmed to actuate the valves based on data received from the pressure sensor.

The sensors may be optical sensors.

With reference to the Figures, a fluid system 104 for cleaning sensors 102 of a vehicle 100 includes a one-way check valve 106 including a check-valve inlet 108 and a check-valve outlet 110; a Y-connector 112 including a Y-connector inlet 114, a first Y-connector outlet 116, a second Y-connector outlet 118, and a pressure-sensor connector 120; an inlet hose 122 fluidly connecting the check-valve outlet 110 and the Y-connector inlet 114; and a pressure sensor 124 fluidly connected to the Y-connector 112 via the pressure-sensor connector 120. The Y-connector inlet 114, Y-connector 112 outlets, and pressure-sensor connector 120 are fluidly connected to each other inside the Y-connector 112.

The fluid system 104 provides cleaning for multiple sensors 102. This fluid system 104 provides for directing fluid to multiple locations in an assembly while tracking the pressure of the fluid, which can be used to assess whether a malfunction has occurred in the fluid system 104. The fluid system 104 provides for a small number of components and a small dimensional stackup, making packaging the Y-connector 112 in an assembly easy.

With reference to FIG. 1, the vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input. The sensors 102 can provide data for autonomous operation.

The vehicle 100 includes a body 126. The body 126 includes body panels 128 partially defining an exterior of the vehicle 100. The body panels 128 may present a class-A surface, e.g., a finished surface exposed to view by a customer and free of unaesthetic blemishes and defects. The body panels 128 include, e.g., a roof 130, etc.

A housing 132 for the sensors 102 is attachable to the vehicle 100, e.g., to one of the body panels 128 of the vehicle 100, e.g., the roof 130. For example, the housing 132 may be shaped to be attachable to the roof 130, e.g., may have a shape matching a contour of the roof 130. The housing 132 may be attached to the roof 130, which can provide the sensors 102 with an unobstructed field of view of an area around the vehicle 100. The housing 132 may be formed of, e.g., plastic or metal.

The sensors 102 may detect the external world, e.g., objects and/or characteristics of surroundings of the vehicle 100, such as other vehicles, road lane markings, traffic lights and/or signs, pedestrians, etc. For example, the sensors 102 may be optical sensors such as radar sensors, scanning laser range finders, light detection and ranging (LIDAR) devices, or image processing sensors such as cameras. Specifically, the sensors 102 can be cameras, which can detect electromagnetic radiation in some range of wavelengths. For example, the cameras may detect visible light, infrared radiation, ultraviolet light, or some range of wavelengths including visible, infrared, and/or ultraviolet light. For another example, the cameras may be a time-of-flight (TOF) cameras, which include a modulated light source for illuminating the environment and detect both reflected light from the modulated light source and ambient light to sense reflectivity amplitudes and distances to the scene.

The sensors 102 may be arranged to collectively cover a 360° field of view with respect to a horizontal plane. The sensors 102 are fixed relative to the housing 132 inside the housing 132. The sensors 102 are fixedly attached directly or indirectly to the housing 132. The field of view of each sensor 102 may overlap the fields of view of the sensors 102 that are circumferentially adjacent to one another, i.e., that are immediately next to each other.

Figure 2:
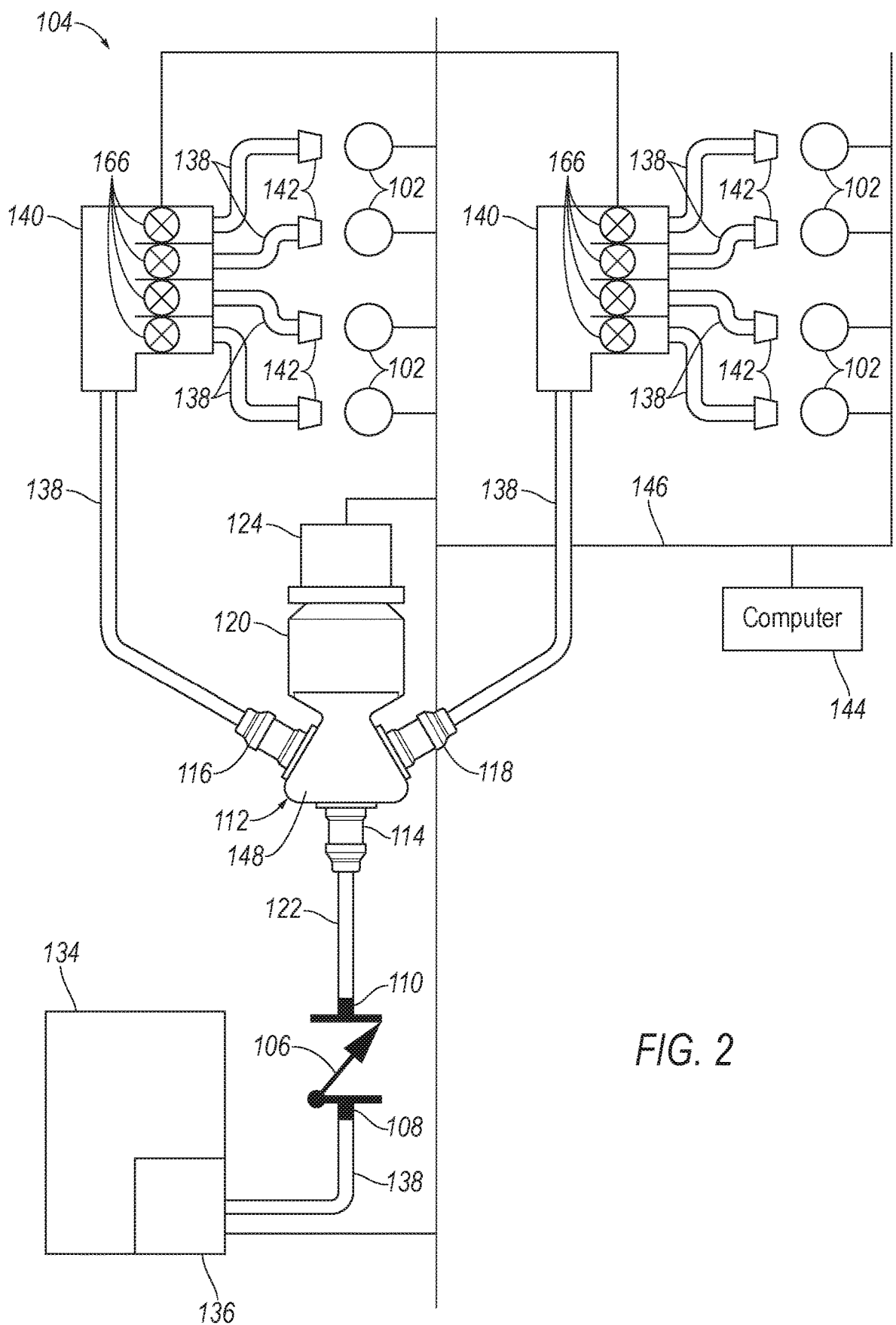
FIG. 2 is a diagram of the fluid system.

With reference to FIG. 2, the fluid system 104 of the vehicle 100 includes a reservoir 134, a pump 136, a plurality of hoses 138 including the inlet hose 122, the Y-connector 112, manifolds 140, valves 166, and nozzles 142. The reservoir 134, the pump 136, and the nozzles 142 are fluidly connected to each other (i.e., fluid can flow from one to the other) via the hoses 138, the Y-connector 112, and the manifolds 140. The fluid system 104 distributes washer fluid stored in the reservoir 134 to the nozzles 142. "Washer fluid" is any liquid stored in the reservoir 134 for cleaning. The washer fluid may include solvents, detergents, diluents such as water, etc.

The reservoir 134 may be a tank fillable with liquid, e.g., washer fluid for window cleaning. The reservoir 134 may be disposed in the housing 132 or alternatively in a front of the vehicle 100, specifically, in an engine compartment forward of a passenger cabin. The reservoir 134 may store the washer fluid only for supplying the sensor 102 apparatus or also for other purposes, such as supply to the windshield.

The pump 136 may force the washer fluid through the hoses 138 to the nozzles 142 with sufficient pressure that the washer fluid sprays from the nozzles 142. The pump 136 is fluidly connected to the reservoir 134. The pump 136 may be attached to or disposed in the reservoir 134. The pump 136 is positioned to supply the check-valve inlet 108, e.g., by being directly connected by one of the hoses 138.

The check valve 106 only permits flow in one direction, namely from the check-valve inlet 108 to the check-valve outlet 110, i.e., flow enters the check valve 106 at the check-valve inlet 108 and exits at the check-valve outlet 110. The check valve 106 can be any suitable type of check valve 106 for the flowrate and pressure produced by the pump 136, e.g., a ball check valve, a diaphragm check valve, a swing check valve, a clapper valve, a stop-check valve, a lift-check valve, a duckbill valve, etc.

The Y-connector 112 splits flow coming from the check valve 106 to the two manifolds 140. Flow arrives to the Y-connector 112 at the Y-connector inlet 114 and exits at the first Y-connector outlet 116 and at the second Y-connector outlet 118. The structure of the Y-connector 112 is described in more detail below.

The manifolds 140 direct flow to one or more of the nozzles 142. The manifolds 140 include a plurality of the valves 166, one corresponding to each of the nozzles 142. Each valve 166 is positioned and operable to control fluid flow from the pump 136 to one of the nozzles 142. Specifically, fluid supplied to the respective manifold 140 from the pump 136 must flow through one of the valves 166 to reach the respective hose 138 providing fluid to the respective nozzle 142. The valves 166 control flow by being actuatable between an open position permitting flow and a closed position blocking flow from the manifold 140 to the respective outgoing hose 138. The valves 166 can be solenoid valves. As a solenoid valve, each valve 166 includes a solenoid and a plunger. Electrical current through the solenoid generates a magnetic field, and the plunger moves in response to changes in the magnetic field. The solenoid moves the plunger between a position in which the valve 166 is open and a position in which the valve 166 is closed.

The hoses 138 fluidly connect the other components of the fluid system 104 together. One of the hoses 138 fluidly connects the pump 136 to the check-valve inlet 108. The inlet hose 122 fluidly connects the check-valve outlet 110 to the Y-connector inlet 114. One of the hoses 138 fluidly connects the first Y-connector outlet 116 to one of the manifolds 140, and one of the hoses 138 fluidly connects the second Y-connector 112 to the other of the manifolds 140. Finally, hoses 138 connect the valves 166 to the nozzles 142 one-to-one. The hoses 138 may be, e.g., flexible tubes.

The nozzles 142 are fixedly positioned to eject fluid onto the sensors 102. For example, each nozzle 142 can be mounted to the housing 132 and aimed at one of the sensors 102.

The pressure sensor 124 can be, e.g., an analog pressure sensor suitable for a low-pressure environment, i.e., up to six bars of pressure. For example, the pressure sensor 124 can be a capacitive pressure sensor.

The fluid system 104 includes a computer 144. The computer 144 is a microprocessor-based computing device, e.g., a generic computing device including a processor and a memory, an electronic controller or the like, a field-programmable gate array (FPGA), an application-specific integrated circuit (ASIC), etc. The computer 144 can thus include a processor, a memory, etc. The memory of the computer 144 can include media for storing instructions executable by the processor as well as for electronically storing data and/or databases, and/or the computer 144 can include structures such as the foregoing by which programming is provided. The computer 144 can be multiple computers coupled together.

The computer 144 may transmit and receive data through a communications network 146 such as a controller area network (CAN) bus, Ethernet, WiFi, Local Interconnect Network (LIN), onboard diagnostics connector (OBD-II), and/or by any other wired or wireless communications network 146. The computer 144 may be communicatively coupled to the sensors 102, the pump 136, the valves 166, the pressure sensor 124, and other components via the communications network 146.

The computer 144 can be programmed to actuate the pump 136 and/or the valves 166 based on data received from the pressure sensor 124 indicating the pressure of the fluid at the Y-connector 112. If the pressure at the Y-connector 112 is inside a range of pressure values, the computer 144 can respond with a default set of instructions to a cleaning request, e.g., by activating the pump 136 and opening the valve 166 corresponding to the sensor 102 that is obstructed or dirty. If the pressure at the Y-connector 112 is outside the range of pressure values, the computer 144 can ignore the default set of instructions, e.g., by preventing the pump 136 from activating and/or preventing the valves 166 from opening. The range of pressure values can be chosen to indicate that a malfunction has occurred causing a pressure drop or spike in the fluid system 104.

Figure 3:
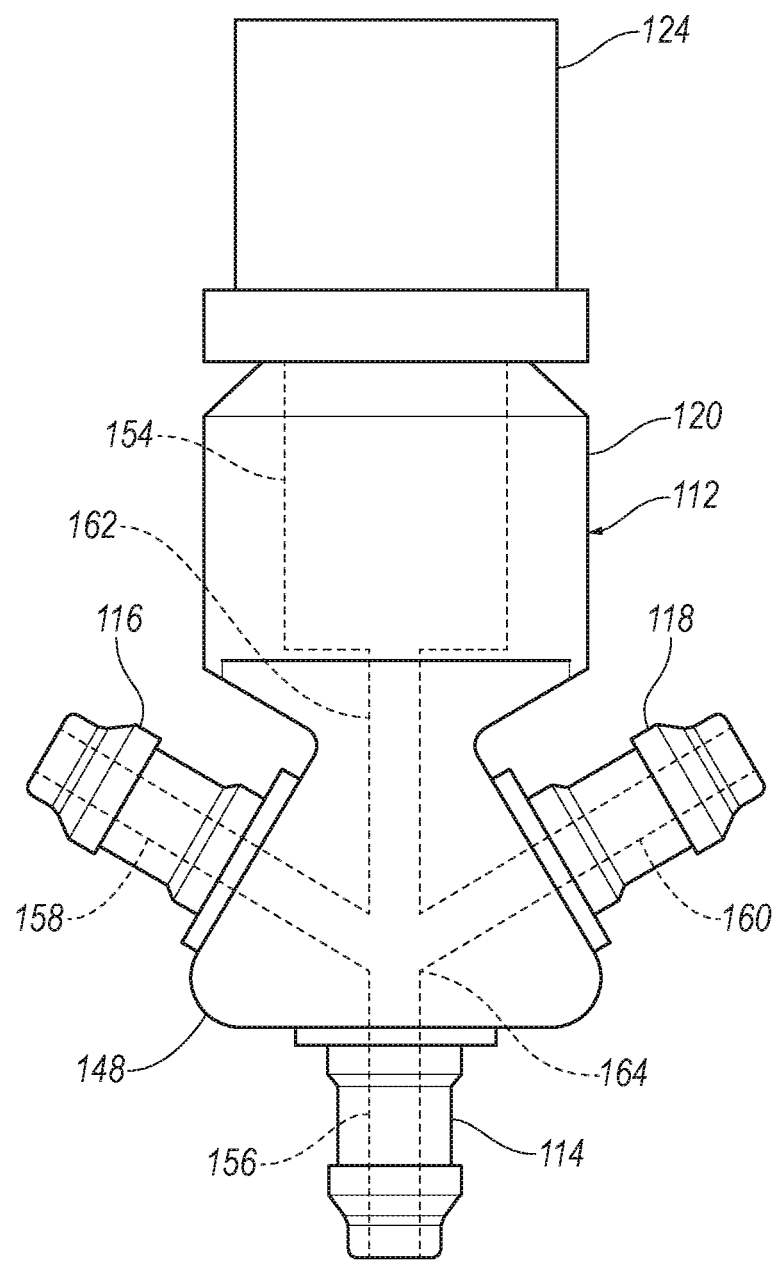
FIG. 3 is a plan view of a Y-connector of the fluid system.
Figure 4:
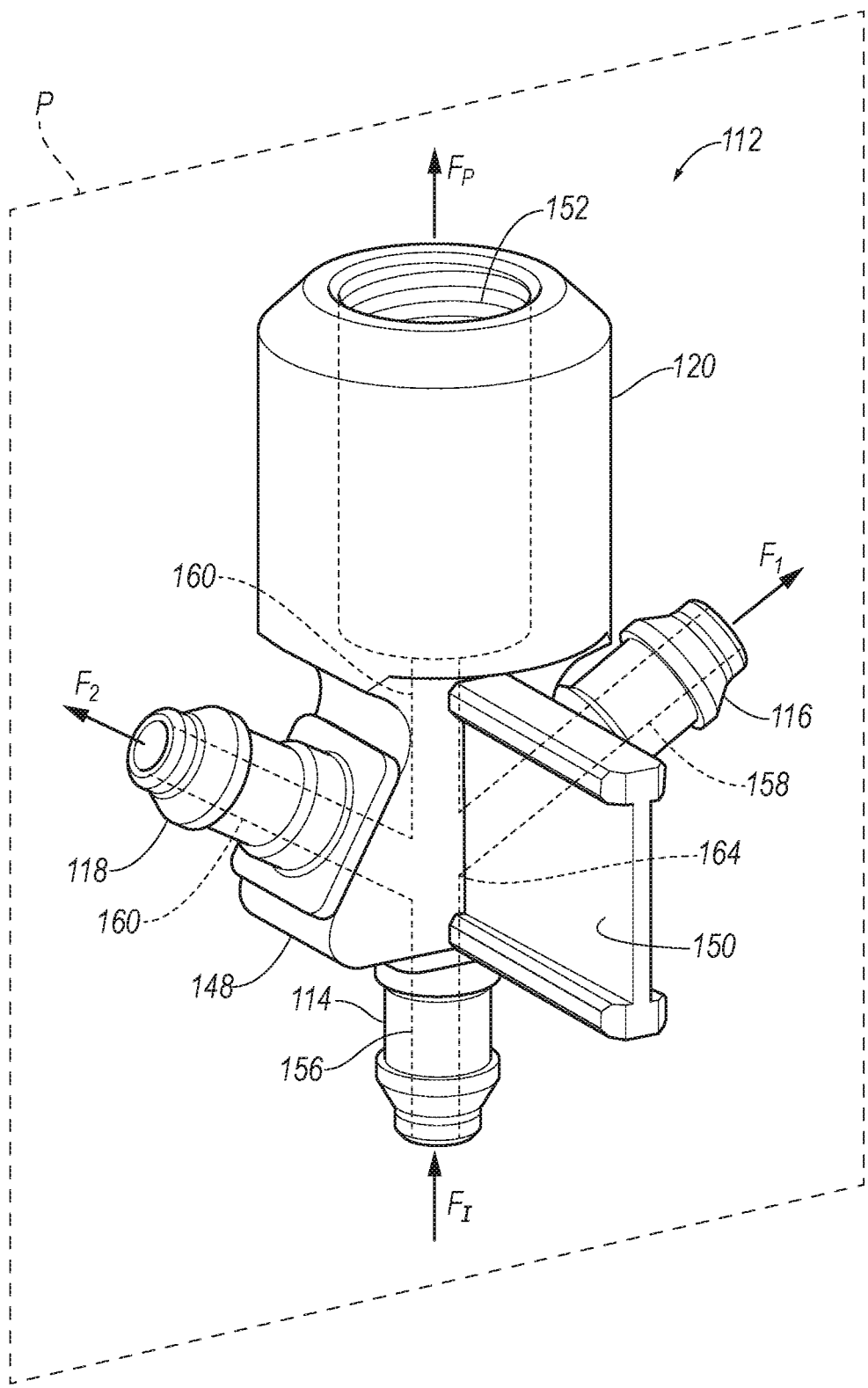
FIG. 4 is a rear perspective view of the Y-connector.

With reference to FIGS. 3 and 4, the Y-connector 112 includes a Y-connector body 148, the Y-connector inlet 114, the first Y-connector outlet 116, the second Y-connector outlet 118, the pressure-sensor connector 120, and a mounting plate 150. The Y-connector inlet 114, the first Y-connector outlet 116, the second Y-connector outlet 118, the pressure-sensor connector 120, and the mounting plate 150 all extend from the Y-connector body 148. The Y-connector 112 is a single piece, i.e., made of a single, uniform piece of material with no seams, joints, fasteners, or adhesives holding it together. Being a single piece can provide for a low number of components and a low dimensional stackup.

The Y-connector inlet 114, first Y-connector outlet 116, and second Y-connector outlet 118 extend away from the Y-connector body 148 in different directions. The Y-connector inlet 114, first Y-connector outlet 116, and second Y-connector outlet 118 are each shaped to connect to one of the hoses 138. For example, the Y-connector inlet 114, first Y-connector outlet 116, and second Y-connector outlet 118 can each be shaped to receive and grip one of the hoses 138 internally. Alternatively, the Y-connector inlet 114, first Y-connector outlet 116, and second Y-connector outlet 118 can each be shaped for one of the hoses 138 to extend around and fasten to externally.

The pressure-sensor connector 120 extends away from the Y-connector body 148 in a different direction than the Y-connector inlet 114, than the first Y-connector outlet 116, and than the second Y-connector outlet 118. The pressure-sensor connector 120 can include a female thread 152 extending inside the pressure-sensor connector 120 for receiving the pressure sensor 124.

The pressure sensor 124 is fluidly connected to the Y-connector 112 via the pressure-sensor connector 120. The pressure sensor 124 directly mounts to the pressure-sensor connector 120, i.e., the pressure sensor 124 is directly connected without any intermediate components. Specifically, the pressure sensor 124 includes a male thread 154 sized to mate with the female thread 152 of the pressure-sensor connector 120.

The Y-connector 112 includes an inlet tunnel 156, a first outlet tunnel 158, a second outlet tunnel 160, a pressure-sensor tunnel 162, and a junction 164. The inlet tunnel 156 extends from an end of the Y-connector inlet 114 through the Y-connector inlet 114 and Y-connector body 148 to the junction 164. The first outlet tunnel 158 extends from an end of the first Y-connector outlet 116 through the first Y-connector outlet 116 and Y-connector body 148 to the junction 164. The second outlet tunnel 160 extends from an end of the second Y-connector outlet 118 through the second Y-connector outlet 118 and Y-connector body 148 to the junction 164. The pressure-sensor tunnel 162 extends from the pressure-sensor connector 120, specifically an internal end of the female thread 152, through the Y-connector body 148 to the junction 164. The junction 164 is inside the Y-connector body 148. The inlet tunnel 156, the first outlet tunnel 158, the second outlet tunnel 160, and the pressure-sensor tunnel 162 all meet at the junction 164.

The Y-connector inlet 114, the first Y-connector outlet 116, the second Y-connector outlet 118, and the pressure-sensor connector 120 each define a flow direction. For the purposes of this disclosure, a flow direction defined by a component means the direction of bulk fluid movement when fluid is moving through the component. The flow directions defined by the Y-connector inlet 114, the first Y-connector outlet 116, and the second Y-connector outlet 118 are in a plane P. The flow direction defined by the pressure-sensor connector 120 can be in the same plane P. The flow direction $F_1$ of the first Y-connector outlet 116 is at least 90°, e.g., more than 90°, e.g., approximately 120°, from the flow direction $F_I$ of the Y-connector inlet 114 in the plane P. The flow direction $F_2$ of the second Y-connector outlet 118 is at least 90°, e.g., more than 90°, e.g., approximately 120°, from the flow direction $F_I$ of the Y-connector inlet 114 in the plane P. This arrangement can provide smoother flow from the Y-connector inlet 114 to the first Y-connector outlet 116 and second Y-connector outlet 118. The flow direction $F_1$ of the first Y-connector outlet 116 is less than 90° from the flow direction $F_P$ of the pressure-sensor connector 120 in the plane P. The flow direction $F_2$ of the second Y-connector outlet 118 is less than 90° from the flow direction $F_P$ of the pressure-sensor connector 120 in the plane P. This arrangement compactly packages the pressure sensor 124 with the Y-connector 112.

An internal diameter of the first Y-connector outlet 116, i.e., a diameter of the first outlet tunnel 158, is equal to an internal diameter of the second Y-connector outlet 118, i.e., a diameter of the second outlet tunnel 160. An internal diameter of the Y-connector inlet 114, i.e., a diameter of the inlet tunnel 156, is equal to the internal diameter of the first Y-connector outlet 116 and to the internal diameter of the second Y-connector outlet 118. This sizing allows the Y-connector 112 to support a standard size for the hoses 138. An internal diameter of the female thread 152 of the pressure-sensor connector 120 is greater than the internal diameter of the first Y-connector outlet 116 and greater than the internal diameter of the second Y-connector outlet 118. The Y-connector 112 can thus support a small size for the hoses 138.

With reference to FIG. 4, the mounting plate 150 extends from the Y-connector body 148. The mounting plate 150 permits attachment of the Y-connector 112 to the housing 132. For example, the housing 132 can include a recess shaped to receive the mounting plate 150. Alternatively or additionally, the mounting plate 150 can be affixed, e.g., bolted, to the housing 132. The mounting plate 150 is a single piece with the rest of the Y-connector 112, which can reduce the number of components and can reduce dimensional stackup.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A fluid system comprising:
a one-way check valve including a check-valve inlet and a check-valve outlet;
a Y-connector including a Y-connector body, a Y-connector inlet, a first Y-connector outlet, a second Y-connector outlet, and a pressure-sensor connector, wherein the Y-connector inlet, Y-connector outlets, and pressure-sensor connector extend from the Y-connector body;
an inlet hose fluidly connecting the check-valve outlet and the Y-connector inlet; and
a pressure sensor fluidly connected to the Y-connector via the pressure-sensor connector;
wherein the Y-connector inlet, Y-connector outlets, and pressure-sensor connector are fluidly connected to each other inside the Y-connector; and
the Y-connector includes a mounting plate extending from the Y-connector body.

2. The fluid system of claim 1, wherein flow directions defined by the Y-connector inlet and Y-connector outlets are in a plane, and the flow direction of each Y-connector outlet is at least 90° from the flow direction of the Y-connector inlet in the plane.

3. The fluid system of claim 2, wherein the flow direction of each Y-connector outlet is more than 90° from the flow direction of the Y-connector inlet in the plane.

4. The fluid system of claim 2, wherein a flow direction of the pressure-sensor connector is in the plane.

5. The fluid system of claim 4, wherein the flow direction of each Y-connector outlet is less than 90° from the flow direction of the pressure-sensor connector in the plane.

6. The fluid system of claim 1, wherein the pressure sensor is directly mounted to the pressure-sensor connector.

7. The fluid system of claim 6, wherein the pressure sensor includes a male thread, and the pressure-sensor connector includes a female thread corresponding to the male thread.

8. The fluid system of claim 7, wherein an internal diameter of the female thread is greater than each internal diameter of the Y-connector outlets.

9. The fluid system of claim 1, wherein the Y-connector includes an inlet tunnel extending through the Y-connector inlet, a first outlet tunnel extending through the first Y-connector outlet, a second outlet tunnel extending through the second Y-connector outlet, a pressure-sensor tunnel extending from the pressure-sensor connector, and a junction at which the inlet tunnel, the outlet tunnels, and the pressure-sensor tunnel all meet.

10. The fluid system of claim 1, wherein an internal diameter of the first Y-connector outlet is equal to an internal diameter of the second Y-connector outlet.

11. The fluid system of claim 1, wherein the Y-connector is a single piece.

12. The fluid system of claim 1, further comprising a pump positioned to supply the check-valve inlet.

13. The fluid system of claim 1, further comprising a housing to which the mounting plate is attached, a plurality of first sensors fixed relative to the housing inside the housing, and a plurality of nozzles aimed at the first sensors, wherein each nozzle is fluidly connected to one of the first Y-connector outlet or the second Y-connector outlet.

14. The fluid system of claim 1, further comprising a plurality of first sensors and a plurality of nozzles aimed at the first sensors, wherein each nozzle is fluidly connected to one of the first Y-connector outlet or the second Y-connector outlet.

15. The fluid system of claim 14, further comprising two manifolds, one positioned to receive flow from the first Y-connector outlet and the other positioned to receive fluid flow from the second Y-connector outlet, wherein the nozzles are each positioned to receive fluid flow from one of the two manifolds.

16. The fluid system of claim 15, wherein the manifolds each include a plurality of manifold valves, wherein each manifold valve is positioned and operable to control fluid flow to one of the nozzles.

17. The fluid system of claim 16, further comprising a computer communicatively coupled to the pressure sensor and the manifold valves, wherein the computer is programmed to actuate the manifold valves based on data received from the pressure sensor.

18. The fluid system of claim 14, wherein the first sensors are optical sensors.

19. A fluid system comprising:
a one-way check valve including a check-valve inlet and a check-valve outlet;
a Y-connector including a Y-connector inlet, a first Y-connector outlet, a second Y-connector outlet, and a pressure-sensor connector;
an inlet hose fluidly connecting the check-valve outlet and the Y-connector inlet;
a pressure sensor fluidly connected to the Y-connector via the pressure-sensor connector; and
a pump positioned to supply the check-valve inlet;
wherein the Y-connector inlet, Y-connector outlets, and pressure-sensor connector are fluidly connected to each other inside the Y-connector.

20. A fluid system comprising:
a one-way check valve including a check-valve inlet and a check-valve outlet;
a Y-connector including a Y-connector inlet, a first Y-connector outlet, a second Y-connector outlet, and a pressure-sensor connector;
an inlet hose fluidly connecting the check-valve outlet and the Y-connector inlet;
a pressure sensor fluidly connected to the Y-connector via the pressure-sensor connector;
a plurality of first sensors; and
a plurality of nozzles aimed at the first sensors;
wherein the Y-connector inlet, Y-connector outlets, and pressure-sensor connector are fluidly connected to each other inside the Y-connector; and
each nozzle is fluidly connected to one of the first Y-connector outlet or the second Y-connector outlet.

* * * * *